(12) United States Patent
Zander et al.

(10) Patent No.: US 12,408,206 B2
(45) Date of Patent: *Sep. 2, 2025

(54) BEAM MANAGEMENT DURING INITIAL ACCESS

(71) Applicant: Sony Group Corporation, Tokyo (JP)

(72) Inventors: Olof Zander, Sodra Sandby (SE); Fredrik Rusek, Eslov (SE); Erik Bengtsson, Eslov (SE); Kun Zhao, Malmo (SE); Jose Flordelis, Lund (SE)

(73) Assignee: Sony Group Corporation, Tokyo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 17/790,714

(22) PCT Filed: Jan. 14, 2021

(86) PCT No.: PCT/EP2021/050665
§ 371 (c)(1),
(2) Date: Jul. 1, 2022

(87) PCT Pub. No.: WO2021/144351
PCT Pub. Date: Jul. 22, 2021

(65) Prior Publication Data
US 2023/0060540 A1    Mar. 2, 2023

(30) Foreign Application Priority Data

Jan. 14, 2020 (SE) .................... 2030011-7

(51) Int. Cl.
*H04B 7/06* (2006.01)
*H04W 74/00* (2009.01)
(Continued)

(52) U.S. Cl.
CPC ........ *H04B 7/0695* (2013.01); *H04W 74/006* (2013.01); *H04W 74/0833* (2013.01)

(58) Field of Classification Search
CPC . H04B 7/0695; H04B 7/0404; H04W 74/006; H04W 74/0833; H04L 5/0048
See application file for complete search history.

(56) References Cited

U.S. PATENT DOCUMENTS

2017/0181132 A1* 6/2017 Xiao .................... H04L 5/005
2018/0331794 A1* 11/2018 Nagaraja ........... H04W 74/0833
(Continued)

FOREIGN PATENT DOCUMENTS

CN    109076543 A    12/2018
CN    109644494 A    4/2019
(Continued)

OTHER PUBLICATIONS

International Search Report and Written Opinion from corresponding International Application No. PCT/EP/2021/050665, Mar. 25, 2021, 15 pages.
(Continued)

*Primary Examiner* — Abdullahi E Salad
(74) *Attorney, Agent, or Firm* — Tucker Ellis LLP

(57) ABSTRACT

A method of operating a wireless communication device (102) configured to connect to a communications network (100) includes: monitoring for multiple downlink reference signals (411) transmitted by at least one access node of the communications network (100) using multiple downlink transmit beams (361-364), each one of the multiple downlink reference signals (411) being associated with a respective at least one of multiple random-access occasions (415-418); and accessing at least two random-access occasions (415, 418) of the multiple random-access occasions (415-418), the at least two random-access occasions (415, 418) being associated with at least two downlink reference signals (411) selected from the multiple downlink reference signals (411) based on said monitoring and establishing a multibeam operation between the wireless communication
(Continued)

device (102) and the communications network (100), wherein the multi-beam operation is established based on at least two downlink transmit beams (361,364) used for transmitting the selected at least two downlink reference signals (411).

20 Claims, 9 Drawing Sheets

(51) Int. Cl.
*H04W 74/08* (2024.01)
*H04W 74/0833* (2024.01)

(56) References Cited

U.S. PATENT DOCUMENTS

| | | | |
|---|---|---|---|
| 2019/0029049 A1 | 1/2019 | Akkarakaran et al. | |
| 2019/0075014 A1 | 3/2019 | Zhou et al. | |
| 2019/0158345 A1* | 5/2019 | Lincoln | H04W 52/0251 |
| 2019/0215220 A1* | 7/2019 | Islam | H04W 74/085 |
| 2019/0254079 A1 | 8/2019 | Akoum et al. | |
| 2019/0357264 A1* | 11/2019 | Yi | H04W 74/002 |
| 2020/0008188 A1* | 1/2020 | Nam | H04W 72/0446 |
| 2020/0068484 A1* | 2/2020 | da Silva | H04W 24/10 |
| 2021/0176789 A1* | 6/2021 | Takahashi | H04B 7/088 |

FOREIGN PATENT DOCUMENTS

| | | |
|---|---|---|
| WO | 2018084800 A1 | 5/2018 |
| WO | 2018089265 A1 | 5/2018 |
| WO | 2018171802 A1 | 9/2018 |
| WO | 2019139730 A1 | 7/2019 |
| WO | 2019139844 A1 | 7/2019 |
| WO | WO-2019192610 A1 | 10/2019 |
| WO | 2019215012 A1 | 11/2019 |

OTHER PUBLICATIONS

Office Action and Search Report from corresponding Swedish Application No. 2030011-7, Dec. 4, 2020, 9 pages.
Yu-Ngok Ruyue Li et al., "Beam Management in Millimeter-Wave Communications for 5G and Beyond," IEEE Access, vol. 8, Jan. 1, 2020, vol. 8, 12 pages.
Nokia et al., "Beam Management in Initial Access," 3rd Generation Partnership Project (3GPP) TSG-RAN WG1#86bis, R1-1610288, Oct. 10-14, 2016, 4 pages.
Nokia et al., "Beam Management Procedures in Beam Based Access," 3rd Generation Partnership Project (3GPP) TSG-RAN WG1#86, R1-167286, Aug. 22-26, 2016, 5 pages.
J. Flordelis et al., "Massive MIMO Performance—TDD versus FDD: What do Measurements Say?", IEEE Transactions on Wireless Communications, vol. 17, No. 4, Apr. 2018, 15 pages.

* cited by examiner

BEAM MANAGEMENT DURING INITIAL ACCESS

TECHNICAL FIELD

Various examples relate to beam management for a multi-beam operation in a communication system. More specifically, various examples relate to beam management during initial access of a wireless communication device to a cellular network.

BACKGROUND

Multiple-input multiple-output (MIMO) techniques are sometimes used to enhance reliability and/or throughput of communication on a wireless link. Here, the transmitter node and the receiver node both include multiple antennas that can be operated in a phase-coherent manner. Thereby, a signal can be transmitted redundantly (diversity multi-antenna mode) along multiple spatial data streams, or multiple signals can be transmitted on multiple spatial data streams (spatial multiplexing multi-antenna operational mode). Spatial data streams can be defined by focusing the transmission energy for transmitting (transmit beam, TX beam) and/or the receive sensitivity for receiving (receive beam, RX beam) to a particular spatial direction. Here, the process of identifying the appropriate beams is often referred to as beam establishment or beam management.

Beam management typically requires control signaling between the nodes of the MIMO communication system. For example, where a MIMO communication system is implemented by a base station of a cellular network and a wireless communication device attachable to the cellular network, initial access of the wireless communication device to the cellular network may impose a framework of control signaling that, according to reference implementations, makes it difficult to implement beam management at this early stage.

SUMMARY

Accordingly, there is a need for advanced techniques of beam management during initial access. This need is met by the features of the independent claims. The features of the dependent claims define embodiments.

A method of operating a UE is provided. The UE is configured to connect to a communications NW. The method includes monitoring for multiple downlink reference signals. The multiple downlink reference signals are transmitted by at least one access node of the communications network. The multiple downlink reference signals are transmitted using multiple downlink transmit beams. Each one of the multiple downlink reference signals is associated with a respective at least one of multiple random-access occasions. The method also includes accessing at least two RA occasions of the multiple RA occasions. The at least two RA occasions are associated with at least two downlink reference signals. The at least two downlink reference signals are selected from the multiple downlink reference signals. Said selecting is based on said monitoring. The method further includes establishing a multi-beam operation between the UE and the communications network. The multi-beam operation is established based on the at least two downlink transmit beams used for transmitting the selected at least two downlink reference signals.

A computer program or a computer-program product or a computer-readable storage medium includes program code. The program code can be executed by at least one processor. Executing the program code causes the at least one processor to perform a method of operating a UE. The UE is configured to connect to a communications NW. The method includes monitoring for multiple downlink reference signals. The multiple downlink reference signals are transmitted by at least one access node of the communications network. The multiple downlink reference signals are transmitted using multiple downlink transmit beams. Each one of the multiple downlink reference signals is associated with a respective at least one of multiple random-access occasions. The method also includes accessing at least two RA occasions of the multiple RA occasions. The at least two RA occasions are associated with at least two downlink reference signals. The at least two downlink reference signals are selected from the multiple downlink reference signals. Said selecting is based on said monitoring. The method further includes establishing a multi-beam operation between the UE and the communications network. The multi-beam operation is established based on the at least two downlink transmit beams used for transmitting the selected at least two downlink reference signals.

A wireless communication device is configured to connect to a communications network. The wireless communication device includes control circuitry configured to monitor for multiple downlink reference signals transmitted by at least one access node of the communications network using multiple downlink transmit beams, each one of the multiple downlink reference signals being associated with a respective at least one of multiple random-access occasions. The control circuitry is further configured to access at least two random-access occasions of the multiple random-access occasions, the at least two random-access occasions being associated with at least two downlink reference signals selected from the multiple downlink reference signals based on said monitoring. The control circuitry is further configured to establish a multi-beam operation between the wireless communication device and the communications network, wherein the multi-beam operation is established based on at least two downlink transmit beams used for transmitting the selected at least two downlink reference signals.

A method of operating at least one access node of a communications network is provided. The method includes transmitting multiple downlink reference signals. The multiple downlink references signals are transmitted using multiple downlink transmit beams. Each one of the multiple downlink reference signals is associated with a respective at least one of multiple RA occasions. The method also includes monitoring an access of the UE to at least two RA occasions associated with at least two downlink reference signals of the multiple downlink reference signals. The method also includes establishing a multi-beam operation based on said monitoring of the access. The multi-beam operation is between the EU and the communications network. The multi-beam operation is established based on at least two downlink transmit beams of the multiple downlink transmit beams that are used for transmitting the at least two downlink reference signals.

A computer program or a computer-program product or a computer-readable storage medium includes program code. The program code can be executed by at least one processor. Executing the program code causes the at least one processor to perform a method of operating at least one access node of a communications network. The method includes transmitting multiple downlink reference signals. The multiple downlink references signals are transmitted using multiple downlink transmit beams. Each one of the multiple downlink reference signals is associated with a respective at least one of multiple RA occasions. The method also includes monitoring an access of the UE to at least two RA occasions associated with at least two downlink reference signals of the multiple downlink reference signals. The method also includes establishing a multi-beam operation based on said monitoring of the access. The multi-beam operation is between the EU and the communications network. The multi-beam operation is established based on at least two downlink transmit beams of the multiple downlink transmit beams that are used for transmitting the at least two downlink reference signals.

At least one access node of a communications network includes control circuitry. The control circuitry is configured to transmit multiple downlink reference signals using multiple downlink transmit beams, each one of the multiple downlink reference signals being associated with a respective at least one of multiple random-access occasions. The control circuitry is also configured to monitor an access of the wireless communication device to at least two random-access occasions associated with at least two downlink reference signals of the multiple downlink reference signals. Further, the control circuitry is further configured to, establish a multi-beam operation between the wireless communication device and the communications network based on said monitoring of the access, wherein the multi-beam operation is established based on at least two downlink transmit beams of the multiple downlink transmit beams used for transmitting the at least two downlink reference signals.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
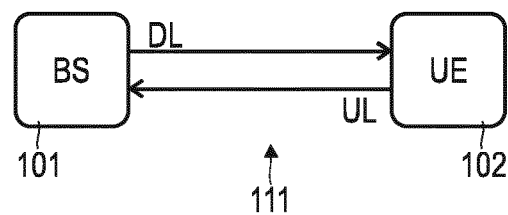
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate initial access of a UE to a communications network, e.g., to a cellular network. In particular, techniques are described that facilitate initial access using MIMO operation. In particular, the techniques described herein facilitate beam management during the initial access of a wireless communication device (UE) to a cellular network (NW). The techniques described herein can be used to reliably determine one or more downlink (DL) transmit (TX) beams at a base station (BS) of the cellular NW to be used for transmitting data to the UE. The one or more DL TX beams can then be used for subsequent communication of data, e.g., application data and/or higher-layer control data. Alternatively or additionally, using the techniques described herein, it is possible to determine one or more uplink (UL) receive (RX) beams at the BS. DL TX beams and UL RX beams are so-called BS beams, because they are employed by the BS.

In some examples, it is also possible to determine UE beams, i.e., UL TX beams and/or DL RX beams. RX beams can be defined by a RX spatial filter. Alternatively or additionally, TX beams can be defined by a TX spatial filter. More generally speaking, a transmission using a spatial filter results in a certain beam or beam pattern.

Once a beam has been determined, this beam can be used for subsequent communication of data, e.g., application data and/or higher-layer control data.

According to various examples, it is possible for the UE to access multiple random-access (RA) occasions, the RA occasions (ROs) being associated with different BS beams. Based on this multi-RO access, it is then possible to establish a multi-beam operation. I.e., information conveyed by or determined based on the multi-RO access can be used to appropriately configure the multi-beam operation. For example, the BS can acquire information on multiple high-quality beam pairs between the BS and the UE already during initial access and at low delay. The overall control signaling overhead can be reduced. The capacity of the wireless link between the UE and the BS can be estimated. The multiple beam pairs determined from the multi-RO access can be used for the multi-beam operation.

For example, the UE may monitor for multiple DL reference signals (RSs). The DL RSs can be transmitted by the BS using multiple DL TX beams. Then, based on a comparison of RX properties of the multiple DL RSs—e.g., a RX amplitude—the UE can determine two or more strongest DL TX beams. The DL RSs can be associated with different ROs. The UE can accordingly select those ROs that are associated with the DL RSs having been transmitted using the two or more strongest DL TX beams. Then, the multi-beam operation—e.g., UL and/or DL multi-beam operation—can be established based on the two or more strongest DL TX beams and/or UL RX beams corresponding to those DL TX beams (e.g., having the same antenna weights). For example, the two or more strongest DL TX beams and/or the corresponding two or more UL RX beams may be used for the transmission in accordance with the multi-beam operation, e.g., for a subsequent data communication during a connected mode. It would also be possible to refine the two or more strongest DL TX beams and/or the corresponding two or more strongest UL RX beams: such beam refinement can include determining sub-beams, e.g., having a narrower beam width.

FIG. 1 schematically illustrates a communication system. The communication system includes two nodes 101, 102 that are configured to communicate with each other via a wireless link 114. In the example of FIG. 1, the node 101 is implemented by an access node, more specifically a BS, and the node 102 is implemented by a UE. The BS 101 can be part of a cellular NW (not shown in FIG. 1). As a general rule, the techniques described herein could be used for various types of communication systems, e.g., also for peer-to-peer communication, etc. For sake of simplicity, however, hereinafter, various techniques will be described in the context of a communication system that is implemented by a BS of a cellular NW and a UE.

Communication on the wireless link 114 can employ time-division duplex (TDD) and/or frequency-division duplex (FDD). Using TDD, communication in the DL and in the UL takes place at different points in time using the same frequency. Using FDD, communication in the DL and in the UL takes place at the same point in time, using different frequencies.

Figure 2:
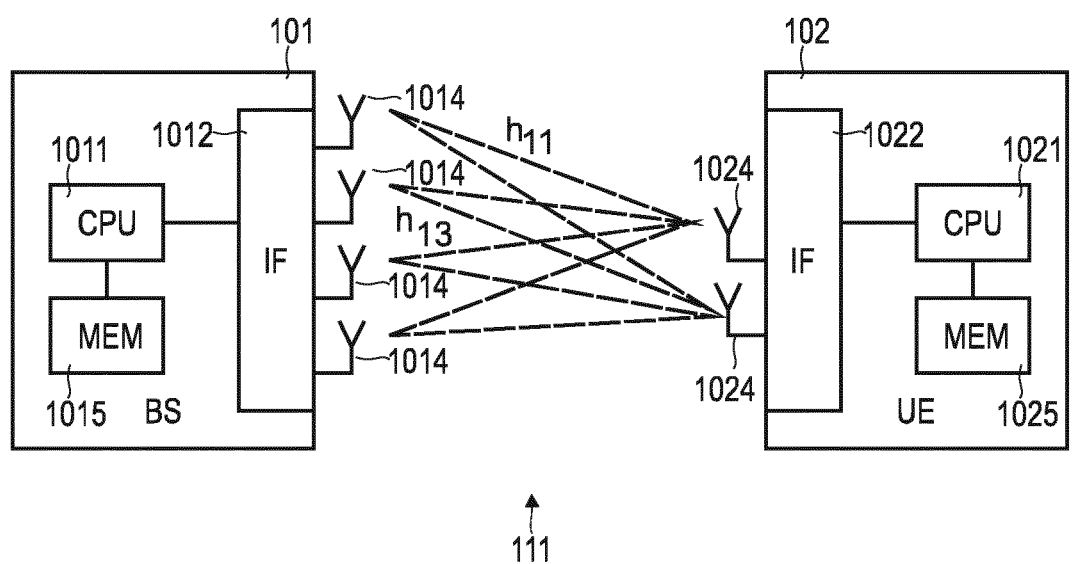
FIG. 2 schematically illustrates MIMO operation of the communication system of FIG. 1 according to various examples.

FIG. 2 illustrates details with respect to the BS 101. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: communicating on a wireless link using MIMO; performing beamsweeps; transmitting signals such as RSs; scheduling signals for transmission on the wireless link; participating in initial access of the UE 102; monitoring for the UE 102 accessing ROs; participating in establishment of a MIMO operation; participating in data transmission in accordance with the MIMO operation; etc.

FIG. 2 also illustrates details with respect to the UE 102. The UE 102 includes control circuitry that is implemented by a processor 1021 and a nonvolatile memory 1025. The processor 1021 can load program code that is stored in the memory 1025. The processor can execute the program code. Executing the program code causes the processor to perform techniques as described herein, e.g.: communicating on a wireless link using MIMO and/or FDD; performing beamsweeps; participating in an initial access of the UE 102 to the cellular NW of the BS 101; monitoring for RSs, i.e., attempting to receive RSs; selecting one or more ROs; participating in establishment of a MIMO operation; participating in data transmission in accordance with the MIMO operation; etc.

FIG. 2 also illustrates details with respect to communication between the BS 101 and the UE 102 on the wireless link 114. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 1014, 1024. Thereby, the BS 101 and the UE 102 implement a MIMO communication system.

As a general rule, the receiver of the MIMO communication system receives a signal y that is obtained from an input signal x multiplied by the transmission matrix H. FIG. 2 includes two example labels for the components $h_{11}$ and $h_{13}$ of the transmission matrix H.

The transmission matrix H defines the channel impulse response of the wireless link 114. The rank of the transmission matrix corresponds to the number of linearly independent rows or columns and, as such, indicates how many independent data streams can be used simultaneously; this is sometimes referred to as the number of layers. The rank can be set in different MIMO transmission modes. For MIMO transmission modes, the amplitude and/or phase (antenna weights) of each one of the antennas 1014, 1024 is appropriately controlled by the interfaces 1012, 1022.

For instance, a diversity MIMO transmission mode relies on transmitting the same data redundantly using multiple TX antennas. Thus, multiple data streams carry the same data.

Thereby, the signal-to-noise ratio can be increased. The redundant signals can be generated using different encoding, e.g., Alamouti encoding.

Another MIMO transmission mode is spatial multiplexing. Spatial multiplexing allows to increase the data rate: The data is divided into different data streams and these different data streams can be transmitted contemporaneously over the wireless link 114.

The diversity MIMO transmission mode and the spatial multiplexing multi-antenna transmission mode can be described as using multiple beams, the beams defining the spatial data streams. These modes are, therefore, also referred to as multi-beam operation. By using a beam, the direction of the wavefront of signals transmitted by a transmitter of the communication system is controlled. Energy is focused into a respective direction, by phase-coherent superposition of the individual signals originating from each antenna 1014, 1024. Thereby, the spatial data stream can be directed. The spatial data streams transmitted on multiple beams can be independent, resulting in spatial multiplexing multi-antenna transmission; or dependent on each other, e.g., redundant, resulting in diversity MIMO transmission.

As a general rule, alternatively or additionally to such TX beams, it is possible to employ RX beams.

The concept of beams can be used in so-called beam-sweeps. Details with respect to beamsweeping are explained next in connection with FIG. 3 and FIG. 4.

Figure 3:
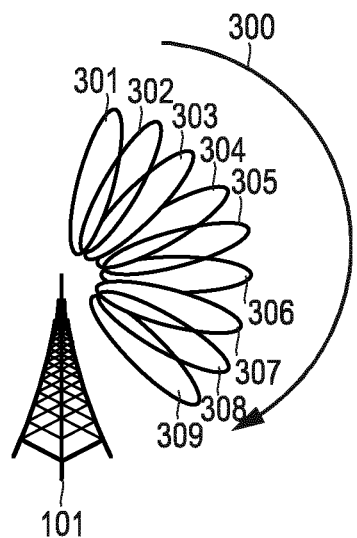
FIG. 3 schematically illustrates a transmit beam sweep of a base station of the communication system according to various examples.

FIG. 3 illustrates DL TX beams 301-309 used by the BS 101. In some examples, the BS 101 can employ a beam-sweep 300. Here, the BS 101 activates the beams 301-309 on different resources (e.g., different time-frequency resources, and/or using orthogonal codes) such that the UE 102 can monitor for respective signals transmitted on the DL TX beams 301-309. As a general rule, monitoring for signals can pertain to attempting to receive signals. This can include blind decoding, etc. The UE 102 may then select the best DL TX beam 301-309—e.g., based on a RX property of the received signal, such as amplitude and/or phase and/or angle-of-arrival, etc.—and provide a respective indication to the BS 101. As a general rule, the best DL TX beam 301-309 could be the strongest beam. Also, other quality metrics may be taken into account, e.g., signal-to-noise. Then, subsequent data can be communicated on the selected DL TX beam 301-309. Such beam management can, in particular, be facilitated by using RSs, i.e., signals having a well-defined transmit property such as sequence, amplitude, phase, and/or precoding, etc.. RSs are sometimes also referred to as pilot signals.

Figure 4:
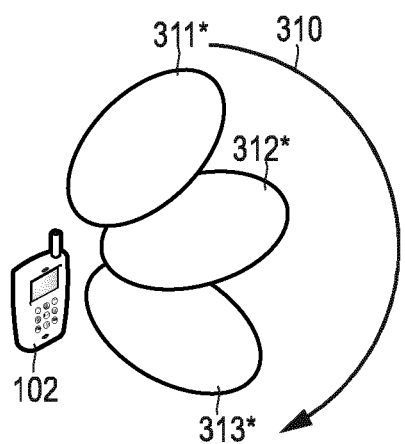
FIG. 4 schematically illustrates a receive beam sweep of a wireless communication device of the communication system according to various examples.

It would be possible that such DL TX beamsweep 300 implemented by the BS 101 is coordinated with a DL RX beamsweep 310 implemented by the UE 102. A DL RX beamsweep 310 is illustrated in FIG. 4. The DL RX beamsweep 310 includes multiple DL RX beams **311\*-313\*** (for sake of simplicity, throughout this text, RX beams are denoted with "\*"). The DL RX beamsweep 310 does not necessarily have to be coordinated with a DL TX beamsweep 300.

Figure 5:
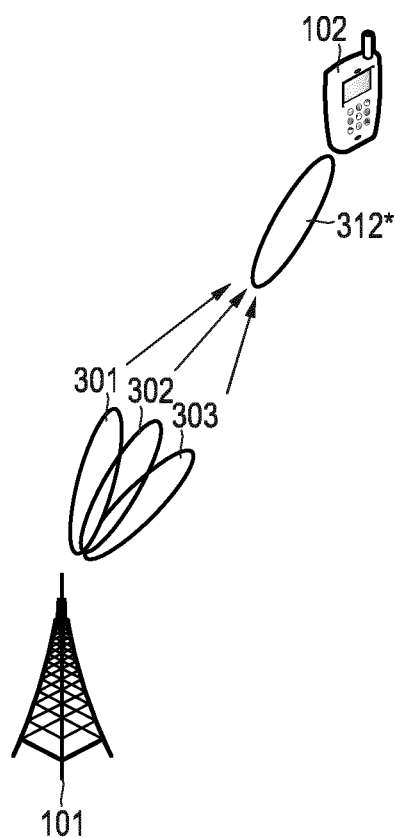
FIG. 5 schematically illustrates multi-beam operation of the wireless communication system according to various examples.

FIG. 5 schematically illustrates aspects with respect to the diversity MIMO transmission mode. Here, the multiple transmit antennas are used to define multiple spatial data streams that carry the same data; this can also be viewed as a coherent combination of multiple DL TX beams 301-303 with optimized phase shifts.

Figure 6:
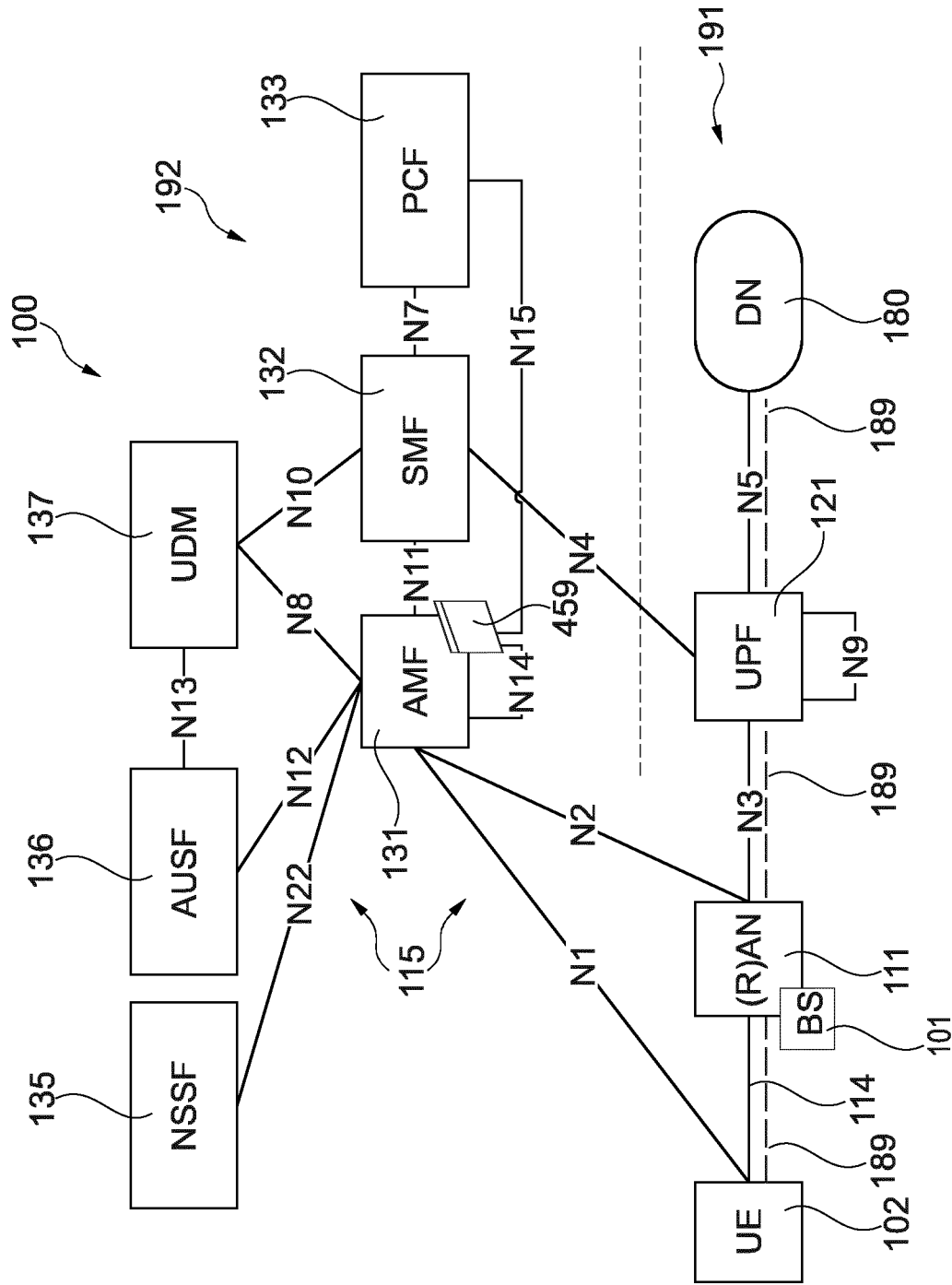
FIG. 6 schematically illustrates a cellular network according to various examples.

FIG. 6 schematically illustrates a cellular NW 100. The example of FIG. 6 illustrates the cellular NW 100 according to the 3GPP NR/5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 102 is connectable to the cellular NW 100 via a data connection. For example, the UE 102 may be one of the following: a cellular phone; a smart phone; an IOT device; an MTC device; a sensor; an actuator; etc.

The UE 102 is connectable to a core NW (CN) 115 of the cellular NW 100 via a RAN 111, typically formed by one or more BSs 101 (only a single BS 101 is illustrated in FIG. 1 for sake of simplicity). A wireless link 114 is established between the RAN 111—specifically between one or more of the BSs 112 of the RAN 111—and the UE 102.

The wireless link 114 implements a time-frequency resource grid. Typically, OFDM is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels or RSs of the wireless link 114.

Examples include: Physical DL Shared Channel (PDSCH); Physical DL Control Channel (PDCCH); Physical UL Shared Channel (PUSCH); Physical UL Control Channel (PUCCH); channels for random access; etc.. For FDD, the PUCCH and PUSCH are communicated on the wireless link 114 in the UL frequency band 601 and the PDCCH and the PDSCH are in the DL frequency band 602 (hence, the names "UL frequency band" and "DL frequency band").

The CN 115 includes a user plane (UP) 191 and a control plane (CP) 192. Application data—e.g., of a data service—is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW (DN) 180, e.g., the Internet or a Local Area NW. Application data can be communicated between the UE 102 and one or more servers 181 of the data NW 180. The server 181 can execute an application that provides a service associated with the application data.

The cellular NW 100 also includes a mobility-control node, here implemented by an Access and Mobility Management Function (AMF) 131. The cellular NW 100 also includes a session-control node, here implemented by a Session Management Function (SMF) 132. The cellular NW 100 further includes a Policy Control Function (PCF) 133; a NW Slice Selection Function (NSSF) 135; an Authentication Server Function (AUSF) 136; and a Unified Data Management (UDM) 137.

FIG. 6 also illustrates the protocol reference points N1-N22 between these nodes.

The AMF 131 provides one or more of the following functionalities: connection management sometimes also referred to as registration management; NAS termination for communication between the CN 115 and the UE 102; connection management; reachability management; mobility management; connection authentication; and connection authorization. After UE registration to the NW, the AMF 131 creates a UE context 459 and keeps this UE context, at least as long as the UE 102 is registered to the cellular NW 100. The UE context 459 can hold one or more identities of the UE 102 (UE ID), e.g., temporary identities.

The SMF 132 supports a data connection 189. The data connection 189 is established by the SMF 132 if the respective UE 102 operates in a connected connection mode. The data connection 189 is established on the wireless link 114. The wireless link 114 can pertain to the underlying physical medium and the data connection 189 can include a set of logical channels, scheduling rules, etc. The data connection 189 may include one or more data flows or bearers such as a dedicated data flow/bearer or a default data flow/bearer. The state of the data connection is also defined on the RRC layer, e.g., generally Layer 3 of the OSI model. The SMF 132 provides one or more of the following functionalities: session management including session establishment, modify and release, including data flow/bearer set up of UP data flows/bearers between the RAN 111 and the UPF 121; selection and control of UPFs; configuring of traffic steering; etc.

Figure 7:
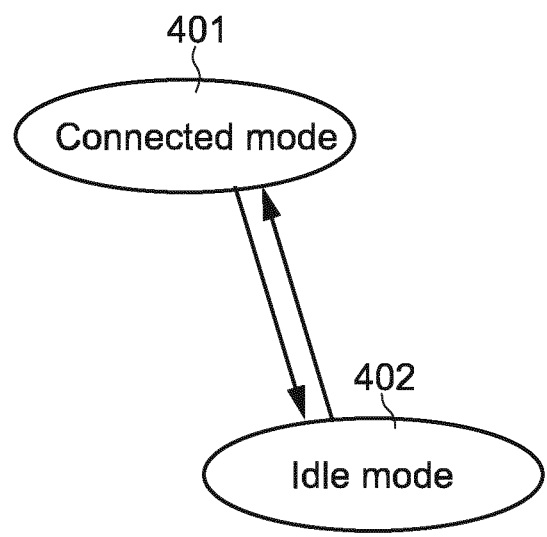
FIG. 7 schematically illustrates multiple connection modes in which the wireless communication device can be operated according to various examples.

FIG. 7 illustrates aspects with respect to different connection modes 401-402 in which the UE 102 can operate according to various examples. When operating in the connected connection mode 401, the data connection 189 between the UE 102 and the cellular NW 100 is established. Application data can be communicated to and from the UE 102. A transition into the connected connection mode 401 is referred to as initial access.

When operating the UE 102 in the idle connection mode 402, the data connection 189 is released. It would be possible that the AMF 131 maintains the UE context 459. The UE 102 can use a discontinuous reception cycle (DRX) cycle that alternatingly switches the interface 1022 between an inactive state and an active state. The interface 1022—when operating in the inactive state—may not be able to RX any signals. E.g., an amplifier or an analogue to digital converter or parts of the digital front end may be switched off. On the other hand, the interface 1022—when operating in the active state—may be able to RX signals, e.g., paging signals.

To transition from the idle connection mode 402 to the connected connection mode 401, a RA procedure may be performed. The RA procedure includes transmitting a RA preamble at a RO. Details with respect to the ROs are illustrated in FIG. 8.

Figure 8:
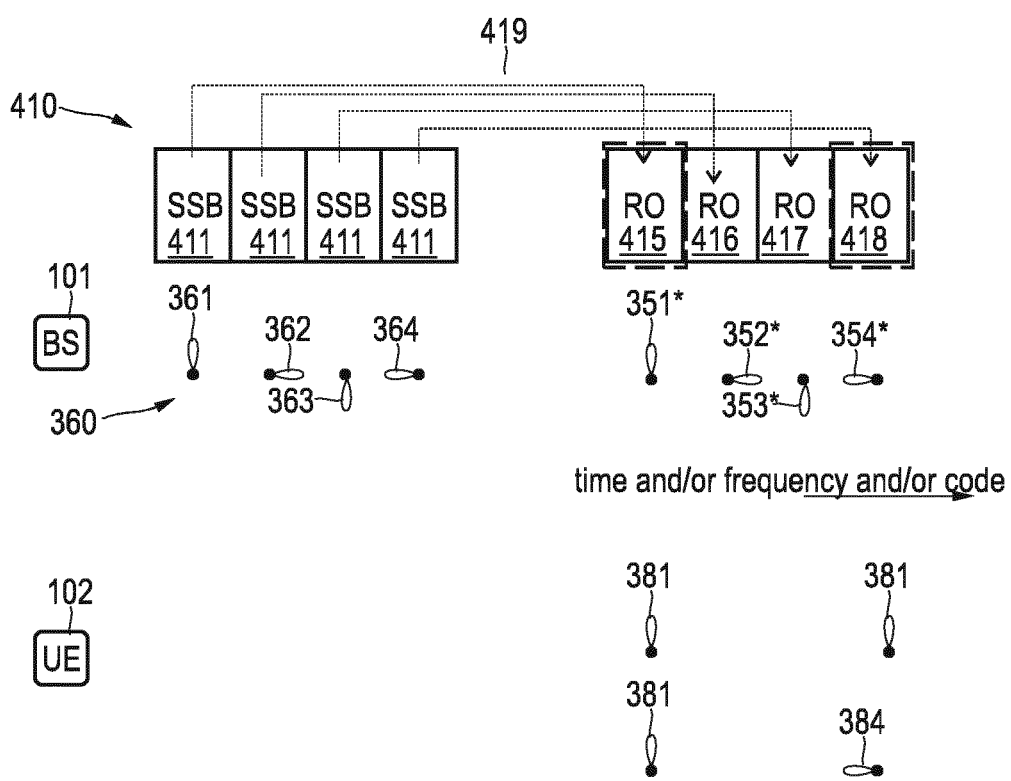
FIG. 8 schematically illustrates multiple random-access occasions for initial access of the wireless communication device to the cellular network according to various examples.

FIG. 8 schematically illustrates aspects with respect to synchronization signal blocks (SSBs). FIG. 8 illustrates that the BS 101 transmits multiple SSBs 411 at different resources, e.g., time-frequency and/or code resources.

The SSBs 411 can facilitate a cell search for the UE 102 during initial access. An SSB 411 can, e.g., include a primary synchronization signal (SS) and a secondary SS. The primary SS and the secondary SS implement RSs. The SSBs 411 can include a physical broadcast channel (PBCH). The PBCH carries a master information block and uses a specific modulation, typically quadrature phase shift keying, for reliable reception.

Within an SSB 411, the primary SS and the secondary SS are for the UE 102 to lock in to the correct frequency and time. There is also some identity of the transmitting BS 101 encoded into the combined SS. When in sync, the UE 102 can extract information about the associated RA channel allocation from the PBCH.

The SSBs 411 can be repeatedly or periodically transmitted by the BS 101, e.g., on predefined time-frequency resources of the time-frequency resource grid.

It is possible that a burst 410 of SSBs 411 is transmitted, employing a beamsweep 360 including the DL TX beams 361-364. Thereby, spatial coverage can be increased. Typically, the burst may have a duration of, e.g., up to 5 ms. The periodicity with which the bursts are transmitted may be 20 ms to 160 ms.

The SSBs 411 transmitted on different DL TX beams 361-364 can have a different SSB time index. Thus, different SSBs 411—i.e., having different SSB time indices—are associated with different ROs 415-418.

FIG. 8 also illustrates aspects with respect to the ROs 415-418. As illustrated in FIG. 8, there is an association 419 between SSBs 411 of the burst 410 having different SSB time indices, and multiple ROs 415-418. The different ROs 415-418 are arranged at different times, frequencies or employ different—e.g., orthogonal—codes for the RA preamble.

The association 419 between the SSBs 411 and the ROs 415-418 is typically implemented by pre-defining a number of SSB time indices per RO. This number can be larger than one which corresponds to multiple SSBs being associated with a single RO. The number can also be smaller than one which corresponds to a single SSB corresponding to multiple ROs. The SSBs (e.g., in ascending order of the time index) are then associated with the ROs, firstly, in frequency domain; secondly, in time domain within a slot; and thirdly in time domain between RA slots.

By selecting the appropriate RO 415-418, the UE 102 can indicate—according to reference implementations—which DL TX beam 361-364 was best. This enables to establish an appropriate beam pair during initial access.

The general framework of beam management during initial access has been described above. This framework of beam management during initial access can be enhanced by inventive concepts pertaining to multi-RO access. Such examples will be described next.

In the example of FIG. 8, the UE 102 accesses two ROs 415, 418, to establish multiple beam pairs. As a general rule, in the various examples described herein, it is possible that the UE 102 accesses two or more ROs. Then, multi-beam operation can be established on the wireless link 114 using the BS beams associated with the selected ROs: for DL transmission, this would include the DL TX beams 361, 364; and for UL transmission this would include the UL RX beams 351*and 354*. The UL RX beam 351* corresponds to the DL TX beam 361 in that it has a similar spatial characteristic and/or assumed beam correspondence. For example, the same antenna weights may be used for the BS beams 351* and 361.

FIG. 8 also illustrates aspects with respect to beam management at the UE 102 for UL TX beams to be used by the UE 102 to access the multiple ROs. There are various options available for implementing the access to the multiple ROs at the UE 102. Two of these options are illustrated in FIG. 8: in a first option (option I), it would be possible that the UE 102 uses the same UL TX beam—here, UL TX beam 381—for accessing both the ROs 415, 418. In a second option (option II), it would be possible that the UE 102 uses different UL TX beams—here, UL TX beams 381 and 384—for accessing the ROs 415, 418. It would also be possible that for some ROs different UL TX beams are used, while for other ROs the same UL TX beams are used.

In option I, the BS 101 can coherently combine signals received using multiple UL RX beams with optimized phase shift and/or amplitude, thereby obtaining a higher multi-antenna gain for rank-1 transmissions. The UL TX beam 381 used in option I to access, both, the RO 415, as well as the RO 418 is determined in accordance with the DL TX beam 361. For example, it would be possible that the UE 102 determines an angle of arrival of the SSB 411 transmitted using the DL TX beam 361, e.g., based on a receive property of a corresponding RS included in the SSB 411, e.g., the amplitude and/or phase at the various antennas 1024 of the UE 102. Then, the UE 102 could determine the appropriate antenna weights so as to transmit UL signals with the same spatial characteristics, i.e., to invert the direction of the spatial data stream. This can be helpful under the assumption of channel reciprocity.

On the other hand, the UL TX beams 381, 384 used in option II to access the RO 415 and the RO 418, respectively, is determined in accordance with the DL TX beams 361 and 364, respectively. The DL TX beam 361 is used to transmit the SSB 411 that is associated with the RO 415 which is accessed using the UL TX beam 381. The DL TX beam 364 is used to transmit the SSB 411 that is associated with the RO 418 which is accessed using the UL TX beam 384.

Thereby, according to option I, it is possible to configure a spatial diversity multi-antenna mode in which a single DL RX beam—i.e., DL RX beams 381* corresponding to the UL TX beam 381—is used at the UE 102 (cf. FIG. 5). The BS 101 can use the DL TX beams 361, 364 to generate two dependent spatial data streams. The UE 102 can indicate, in a respective device parameter of the multi-beam operation that it prefers the diversity multi-antenna mode, and/or that it has coherent decoding/encoding capability, and/or whether the diversity multi-antenna mode is for UL transmission and/or DL transmission.

According to option II, spatial diversity or spatial multiplexing multi-antenna operational modes can be used, relying on the multiple DL RX beams 381* and 384*. Multiple beam pairs between UE 102 and BS 101 can be established, already during initial access; these beam pairs can be used after initial access, when communicating payload data. The UE can indicate, in a respective device parameter of the multi-beam operation, that it prefers spatial-multiplexing or diversity multi-antenna mode, and/or has coherent or non-coherent operation, and/or whether the respective multi-antenna mode is for UL transmission and/or DL transmission.

Figure 9:
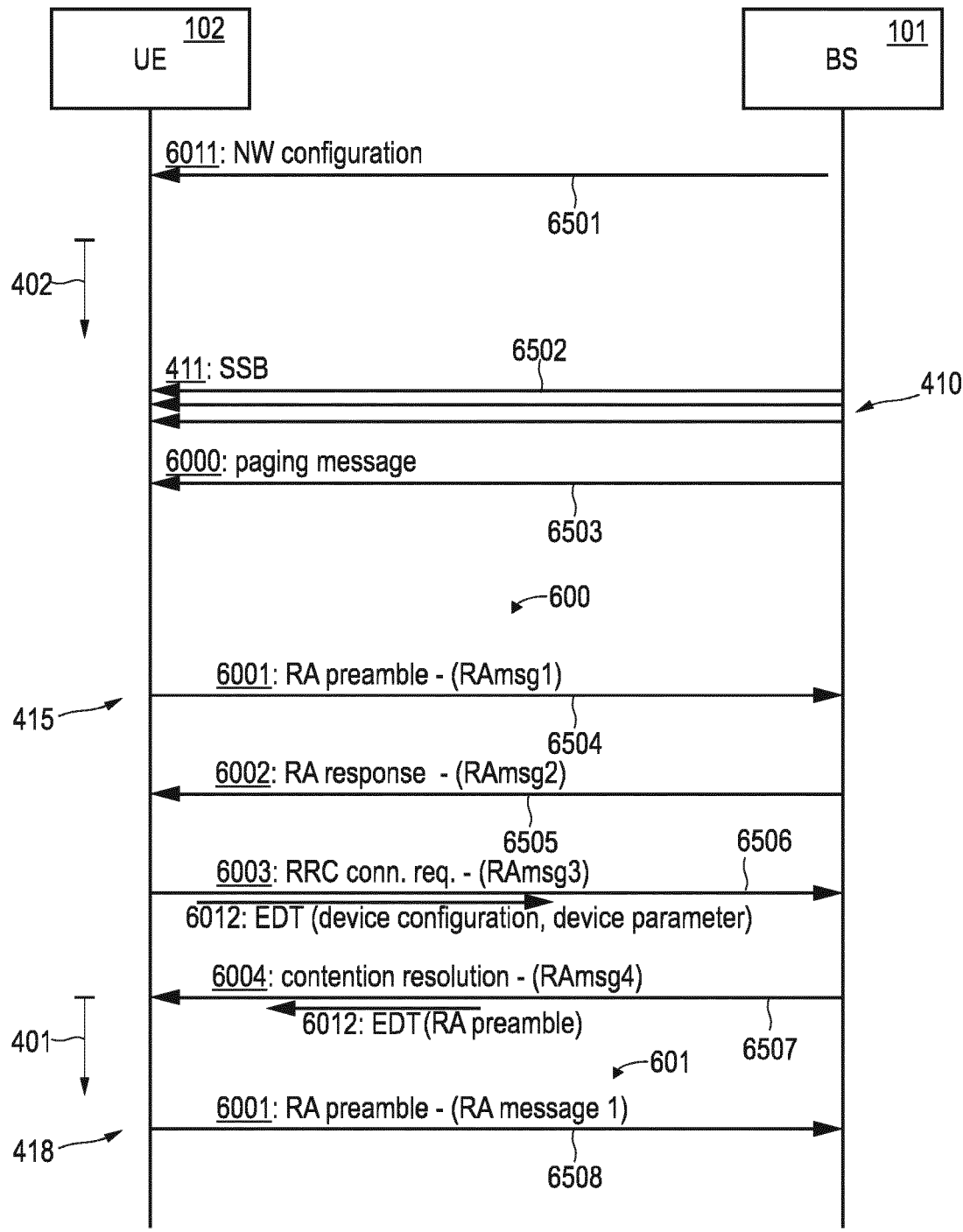
FIG. 9 is a signaling diagram of communicating between the wireless communication device and the cellular network according to various examples.

FIG. 9 is a signaling diagram of communication between the BS 101 and the UE 102. FIG. 9, in particular, illustrates aspects with respect to beam management during initial access, in accordance with FIG. 8. This is one illustrative example; other signal flows are possible.

FIG. 9 illustrates aspects with respect to communicating a configuration regarding access to multiple ROs. The configuration can be communicated from the communications NW 100 to the UE 102—cf. NW configuration 6011—and/or from the UE 102 to the communications NW 100—cf. device configuration at 6506. The multi-RO access then is in accordance with such configuration. For example, such configuration can impose certain constraints on the multi-RO access, e.g., in terms of the number of ROs accessed and/or in terms of the UL TX beams used by the UE for accessing the ROs. The multi-beam operation can be set in accordance with the configuration. Specifically, by communicating the configuration, it is possible for the communications NW 100 to appropriately configure the multi-beam operation. For instance, the UE 102 could indicate that it will use the same UL TX beam for accessing multiple ROs; then, the cellular NW can configure a diversity multi-antenna mode using multiple spatial streams that rely on a single UE beam. The rank of the multi-beam operation may be set in accordance with the indicated number of UL TX beams used by the UE for accessing the ROs.

Initially, at 6501, the UE 102 receives a network configuration 6011 transmitted by the BS 101 of the cellular network 100. The network configuration 6011 is indicative of a network support of the UE 102 accessing multiple ROs 415-418. Thus, the access to more than a single RO 415-418 can be conditional on the respective network support as indicated by the network configuration 6011. If the cellular NW 100 does not support multi-RO access, the UE 102 may only access a single RO 415-418 (e.g., except for escalation strategies where access on a given RO 415-418 fails).

There are various options available of providing the NW configuration to the UE 102. For instance, the NW configuration 6011 could be received on the PDCCH or as a control message on the PDSCH, e.g., as a RRC Layer 3 control message, while operating the UE 102 in the connected connection mode 401. It would also be possible that the NW configuration 6011 is included in a system information block that is broadcasted by the BS 101. In yet another option, it would be possible that the NW configuration 6011 is received during a RA procedure as early data 6012, e.g., at 6507 (as will be explained in detail below).

It would be possible that the NW configuration 6011 is indicative of a maximum number of ROs 415-418 to be accessed by the UE 102. For example, the NW configuration 6011 could be indicative of the UE 102 being allowed to access four or fewer ROs 415-418. Then, the UE 102 may determine the appropriate number of ROs 415-418 to be accessed based on, e.g., its multi-beam operation configuration, a receive property of the RSs included in the SSBs 411 that are transmitted using the multiple beams 361-364, etc., as well as in accordance with the maximum number of ROs.

The NW configuration 6011 can be indicative of a minimum number of UL TX beams to be used by the UE 102 when accessing the ROs 415-418. For example, the NW configuration 6011 could be indicative of the number of UL TX beams expressed in terms of the number of ROs 415-418 to be used. For example, the NW configuration 6011 could be indicative of the UE 102 to use M UL TX beams when accessing N ROs 415-418. M could be equal or smaller than N. M could be a function of N, i.e., M(N).

The NW configuration 6011 could also be indicative of a set number of UL TX beams to be used by the UE 102 when accessing the ROs 415-418. I.e., the NW may set the number of UL TX beams to a certain value. The UE 102 may not have any choice regarding the selection of the number of UL TX beams to be used when accessing the ROs 415-418.

Prior to initiating the RA procedure 600, the UE 102 monitors for SSBs 411 transmitted by the BS 101. This transmission is implemented using a beamsweep, e.g., the beamsweep 360 (cf. FIG. 8). The SSBs 411 transmitted at 6502 thus form a burst 410. Based on the SSBs 411, the UE 102 can synchronize with the BS 101.

The UE 102 can then monitor for paging indicators and paging messages (paging signals) 6000. Blind decoding of the PDCCH for receiving the paging indicator can be implemented.

Upon receiving the paging signal 6000 at 6503, initial access is triggered, in this example using RA procedure 600.

As a general rule, there are other trigger criteria for initial access, e.g., UE power up or UE-originating UL data. As such, the paging signal 6000 is optional.

At 6504, based on the SSBs 411, the UE 102 transmits a RA preamble to the BS 101, in a respective RAmsg1 6001. Thereby, the UE 102 accesses RO 415. This RAmsg1 6001 may be indicative of a temporary identity of the UE 102 (UE-ID).

In response to transmitting the RAmsg1 6001, the UE 102 receives, at 6505, a RA response message, the RAmsg2 6002. The RAmsg2 includes a new temporary identity for the UE 102, timing adjustment information, and an UL scheduling grant for time-frequency resources. The UL scheduling grant may be addressed to the UEs 102 RA Radio NW Temporary Identity (RA-RNTI). Using these UL resources indicated by the UL scheduling grant included in the RAmsg2 6002, the UE 102 sends, at 6506, a RRC connection request RAmsg3 6003. In response to the RRC connection request 6003, the UE 102 receives, at 6507, a contention resolution message RAmsg4 6004 to ensure the right UE is addressed. This finalizes or aborts establishment of the data connection 189. The UE 102 is then transitioned into operation into the connected connection mode 401.

Early data (ED) 6012—e.g., application data or RRC control data—can be included in the RAmsg3 6003 and/or the RAmsg4 6004. Thus, generally UL ED and/or DL ED is possible to be included in the RA procedure. The ED 6012 can be piggybacked to the RAmsg3 6003 and/or the RAmsg4 6004, e.g., in a NAS field. ED 6012 could also be included in RAmsg2, or even in RAmsg1, e.g., by using preamble partitioning. For a 2-step RA procedure, ED can be included in the RAmsgA and RAmsgB (corresponding to RAmsg1 and RAmsg3, and RAmsg2 and RAmsg4, respectively).

At 6508, a further RA preamble 6001 is transmitted by the UE 102, thereby accessing the RO 418. As will be appreciated, the ROs 415 and 418 can be accessed based on the same measurements of the burst 410 of the SSBs 411 transmitted by the BS 101 at 6502 (in other examples, further bursts 410 of SSBs 411 may be monitored). Further, the RO 418 is accessed even though the access to the RO 415 has been successful, i.e., the multi-RO access is not due to an escalation strategy in case of failed RO access.

The UL ED 6012 can be used to provide a device configuration associated with the UE 102 accessing multiple ROs 415-418 to the cellular NW 100. The UE 102 can access the multiple ROs 415-418 in accordance with the device configuration and the BS 101 can monitor the access of the ROs 415-418 in accordance with the device configuration.

For example, the device configuration could be indicative of the UE accessing multiple ROs. For instance, the device configuration could be indicative of the RO 418 that is later on accessed, i.e., of the to-be-accessed ROs. For example, the device configuration could be indicative of whether the same or different UL TX beams are used for accessing the multiple ROs 415-418 (cf. FIG. 8 where two options I and II have been explained, using the same UL TX beam 381 or using different UL TX beams 381, 384). It would be possible that the device configuration is indicative of the number of UL TX beams that are used by the UE 102 for accessing the multiple ROs 415-418. Alternatively or additionally, the device configuration could be indicative of a number of ROs 415-418 that are accessed by the UE 102.

While FIG. 9 illustrates an example in which the device configuration is transmitted in the RA procedure 600 associated with the RO 415, in other examples, it would also be possible that the device configuration is provided otherwise to the cellular NW 100 (e.g., after transitioning to the connected connection mode 401).

The device configuration can be determined in accordance with the NW configuration 6011 received at 6501. For example, the number of ROs 415-418 that are accessed by the UE 102 could be selected to be equal or smaller than the maximum number of ROs to be accessed as indicated by the NW configuration 6011.

Alternatively or additionally to transmitting the device configuration of said accessing of the multiple ROs 415, 418, the ED 6012 can also be used to provide a device parameter of the multi-beam operation to the cellular NW 100. Then, the multi-beam operation can later be established in accordance with the device parameter. The device parameter can be indicative of one or more UE capability limitations in connection with the multi-beam operation. For instance, the UE capability limitation could specify the inability of the UE 102 to coherently receive and/or transmit on multiple beams. The UE capability limitation could specify the inability of the UE 102 to communicate bi-directionally on some of the beams, e.g., single UL, single DL, bidirectional. For instance, the device parameter could indicate a preferred multi-beam operation mode such as diversity or spatial multiplexing or beamsweep. It would be possible that the device parameter includes an analog and/or digital front end capability of the interface 1022 of the UE 102, e.g., whether the UE 102 supports digital beamforming, number of receive chains, a number of transmit chains, etc., to give just a few examples. Alternatively or additionally, it would be possible that the device parameter includes a beam priority order of the DL TX beams 361, 364 used by the BS 101 to transmit the SSB 411 associated with the selected ROs 415, 418 (cf. FIG. 8). The beam priority order could be set, e.g., in accordance with a receive quality of the respective RSs included in the SSB 411. For instance, the receive quality could be determined depending on a receive amplitude. To give an example, in a scenario in which a RS included in the SSB 411 transmitted using the DL TX beam 361 is received at the higher signal-to-noise level than a RS included in the SSB 411 transmitted using the DL TX beam 364, the beam priority order could indicate that the DL TX beam 361 has priority over the DL TX beam 364. This can be considered when establishing, e.g., spatial multiplexing multi-antenna operation so that data is routed at a lower data rate via the spatial data stream associated with the DL TX beam 364, if compared to the spatial data stream associated with the DL TX beam 361. The device parameter may be indicative of whether or not the UE 102 uses multiple beams for accessing the multiple ROs. The device parameter could be indicative of a number of beams that the UE 102 uses for accessing the multiple ROs.

While FIG. 9 illustrates an example in which the device parameter is transmitted in the RA procedure 600 associated with the RO 415, in other examples, it would also be possible that the device parameter is provided otherwise to the cellular NW 100 (e.g., after transitioning to the connected connection mode 401).

For example, the beam priority order as described above could also be implicitly the indicated to the cellular NW 100 based on the sequence with which the ROs 415-418 are being accessed. For example, the scenario FIG. 8 and FIG. 9, the RO 415 is accessed before accessing the RO 418. This indicates the DL TX beam 361 having higher priority if compared to the DL TX beam 364, because the DL TX beam 361 is used for transmitting the SSB 411 that is associated with the RO 415 and the DL TX beam 364 is used for transmitting the SSB 411 that is associated with the RO 418.

In the example of FIG. 9, the DL ED 6012 could be used in order to indicate which RA preamble 6001 is to be used by the UE 102 for accessing the RO 418 at 6508. Accordingly, the further RA preamble 6001 transmitted at 6508 can be contention free. The contention-free RA preamble could be provided as part of the DL ED 6012. Differently, the RA preamble 6001 transmitted at 6504 when accessing the RO 415 could be contention-based.

As a general rule, it would be possible that multiple ROs 415-418 are accessed with (i) contention-based random-access preambles only, (ii) contention free RA preambles only, or (iii) a mixture of contention-based and contention free RA preambles, as illustrated in FIG. 9. Details with respect to (i)-(iii) are explained in Table 1.

TABLE 1

Options for choice of RA preamble when accessing multiple ROs

| Choice of RA preamble | Explanation |
|---|---|
| (i) | Multiple contention-based preambles are used in multiple ROs. For example, different or the same contention-based preamble may be used. ED transmitted in the first RA procedure can include device configuration of multi-RO access and/or device parameter of multi-beam operation. |
| (ii) | Multiple contention-free preambles are used. NW configuration of multi-RO access, UE-ID can be provided prior to initial access to the UE 102. |
| (iii) | UE-ID acquired from first-accessed RO that is accessed using contention-based RA preamble. Subsequent ROs are accessed using contention-free RA preambles. This enables to identify the UE instantaneously and establish the multi-beam operation. NW configuration of multi-RO access can be provided as ED in RAmsg2 or RAmsg4 or RAmsgB. ED transmitted in the first RA procedure can include device configuration of multi-RO access and/or device parameter of multi-beam operation. |

While FIG. 9 illustrates an example of a 4-step RA procedure 600, similar techniques may be readily employed for a 2-step RA procedure.

Figure 10:
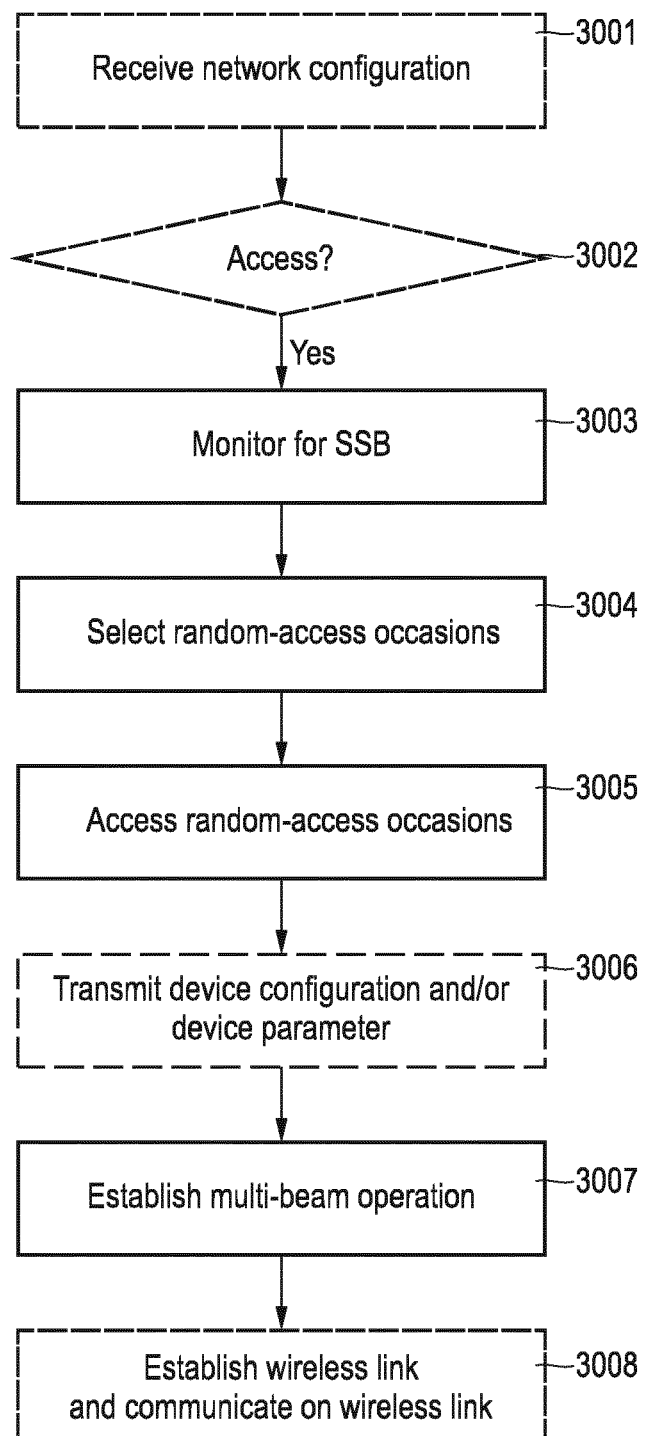
FIG. 10 is a flowchart of a method according to various examples.

FIG. 10 is a flowchart of a method according to various examples. The method of FIG. 10 may be executed by a UE connectable to a cellular NW. For instance, the method of FIG. 10 could be executed by the UE 102. More specifically, the method of FIG. 10 could be executed by the processor 1021 of the UE 102, upon loading program code from the memory 1025.

Optional boxes are indicated with dashed lines in FIG. 10.

At box 3001, the UE receives a NW configuration from the cellular NW. The NW configuration is indicative of a NW support of the UE accessing multiple ROs for the purpose of configuring a multi-beam operation. In particular, the NW configuration can be received from a BS of a cell of the cellular NW that thereby indicates its support of the UE accessing multiple ROs. Alternatively or additionally, it would also be possible that the NW configuration is received from an anchoring node associated with the UE, e.g., a mobility control node such as the AMF 131 (cf. FIG. 6).

Next, at box 3002, the UE checks whether it is to perform an initial access. If yes, the method proceeds to box 3003.

At box 3003, the UE monitors for SSBs. The UE receives one or more SSBs that can have different time indices. Different SSBs within a burst are transmitted using different DL TX beams. The SSBs include DL RSs. Each SSB is associated with a respective ROs.

The UE can then select, at box 3004, at least two of these ROs. The selected at least two ROs are associated with at least two DL RSs included in the received SSBs that are selected by the UE based on the monitoring at box 3003. For instance, the N strongest DL RSs (i.e., being received with the highest signal-to-noise ratio) could be selected.

At box 3005, the selected at least two ROs are accessed. I.e., RA preambles are transmitted at the selected at least two ROs. Contention free and/or contention-based RA preambles may be used.

At box 3006, it is optionally possible to transmit a device configuration of said accessing of the at least two ROs and/or a device parameter for the subsequent multi-beam operation to the cellular NW. For instance, this can be done using ED piggybacked to the RAmsg3 or RAmsgA.

Note that box 3006 can be executed before the access to the multiple ROs at box 3005 is completed.

At box 3007, multi-beam operation of a wireless link between the UE and the cellular NW is established. The multi-beam operation is established in accordance with the access to the multiple ROs at box 3005. For example, it would be possible that multiple DL TX beams are used for the multi-beam operation, wherein the multiple DL TX beams are associated with the ROs that are accessed at box 3005. More specifically, the multiple DL TX beams that are used for the multi-beam operation that is established at box 3007 can be used for transmitting the SSBs associated with the selected at least two ROs of box 3004. It would also be possible to refine these beams, e.g., use sub-beams.

The multi-beam operation may be used after the RA procedure has concluded.

For example, a selection could be made between a diversity multi-antenna mode or a spatial multiplexing multi-antenna operation mode, in accordance with the access to the multiple ROs at box 3005.

At box 3008, it is then possible to establish the wireless link between the UE and the cellular NW, e.g., by completing a RA procedure triggered by the access to one of the ROs that are accessed at box 3005. The RA procedure can be completed using the multi-beam operation that is established at box 3007. Further, subsequent communication on the then established wireless link can be implemented using the multi-beam operation that is established at box 3007.

The order of boxes 3001-3008 is an example only. For example, it would be possible that the NW configuration is received as part of a RA procedure that is triggered by the RO access of box 3005 (as such, box 3001 can be executed after box 3005).

Figure 11:
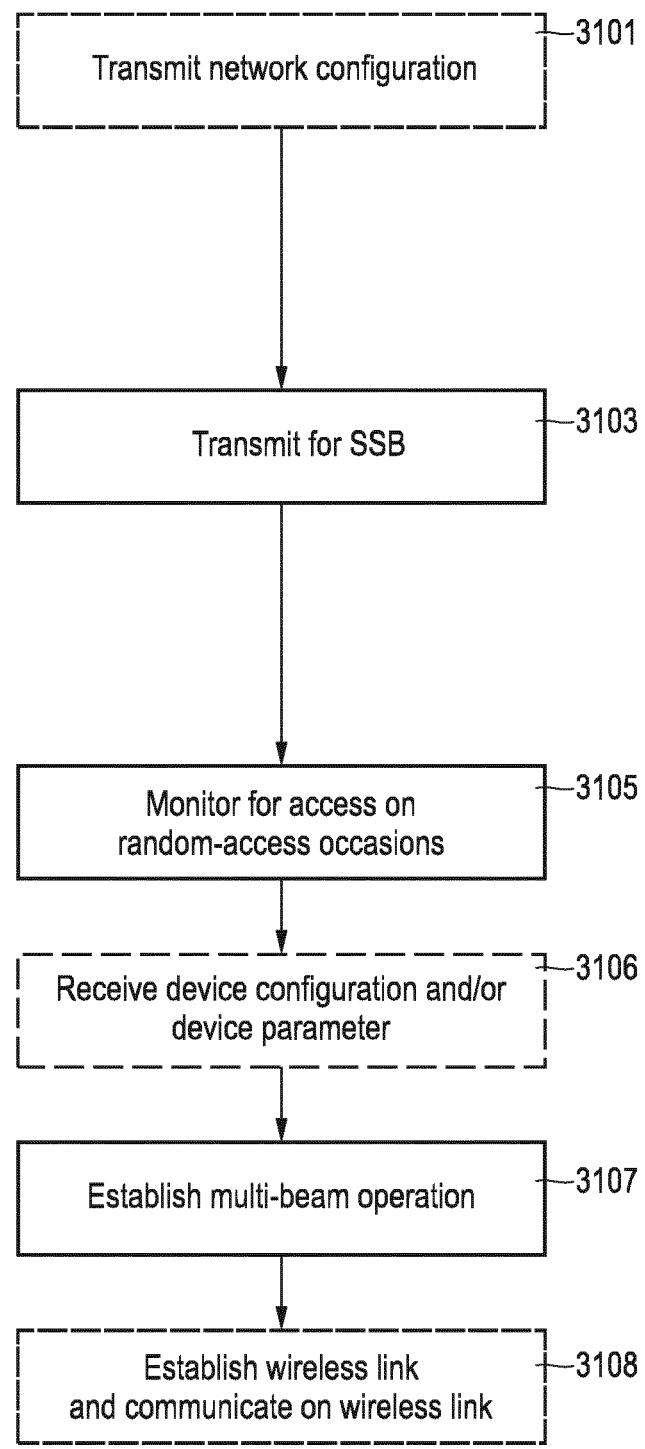
FIG. 11 is a flowchart of a method according to various examples.

FIG. 11 is a flowchart of a method according to various examples. The method of FIG. 11 can be executed by an access node of a communications NW. For instance, the method of FIG. 11 could be executed by a BS of a cellular NW, e.g., the BS 101 of the cellular NW 100. More specifically, it would be possible that the method of FIG. 11 is executed by the processor 1011 of the BS 101, upon loading program code from the memory 1015.

The method of FIG. 11 is interrelated with the method of FIG. 10. I.e., the BS 101 and the UE 102 interact when executing the methods of FIG. 10 and FIG. 11.

Optional boxes are illustrated with dashed lines in FIG. 11.

The method starts with box 3101. Here, a NW configuration is transmitted to a UE that is in communication with the access node. Box 3101 is interrelated with box 3001. The NW configuration can indicate whether the access node supports the UE accessing multiple ROs, in order to establish a multi-beam operation during initial access. Box 3101 is interrelated with box 3001.

At box 3103, SSBs are transmitted using multiple beams. In particular, a burst of SSBs can be transmitted using a beam sweep. The SSBs include RSs. The UE can sound the channel based on the RSs. Each SSB is associated with a respective RO. Box 3103 is interrelated with box 3003.

At box 3105, the ROs are monitored. I.e., the access node attempts to receive a RA message on the ROs. For example, a BS of a cellular NW can attempt to receive RAmsg1 or RAmsgA on the ROs. Box 3105 is interrelated with box 3005.

By receiving RAmsg1 or RAmsgA on multiple ROs the BS can determine that the same UE has accessed both RAs.

In some examples, it would be possible that based on a receive property—i.e., amplitude and/or phase—of a RS associated with the RA message the BS acquires channel state information. The subsequent multi-beam operation can be configured based on such channel sounding.

At box 3106, it would be possible to receive a device configuration for the multi-RO access of the UE and/or a device parameter of the subsequent multi-beam operation. Box 3106 is interrelated with box 3006.

Then, at box 3107, the multi-beam operation is established. For instance, a diversity multi-antenna mode or a spatial multiplexing multi-antenna operation mode may be activated. The beams used for the multi-beam operation can be determined based on the ROs that are accessed by the UE at box 3105. For instance, each RO can be associated with the respective DL TX beam that has been used to transmit the corresponding SSB. Then, these DL TX beams can be used for the multi-beam operation, or be further refined. For example, the multi-beam operation pertains to UL transmission, then UL RX beams can be used that are corresponding to these DL TX beams, e.g., use the same antenna weights and/or having corresponding spatial characteristics.

The multi-beam operation that is established at box 3107 can be used for completing RA on further accessed ROs, as part of box 3105. The multi-beam operation can also be used for communicating data on the wireless link that is subsequently established at box 3108. Box 3107 corresponds to box 3007. Box 3108 corresponds to box 3008.

Summarizing, above techniques have been described that facilitate multi-beam operation, e.g., using diversity multi-antenna and/or spatial multiplexing multi-antenna operation. Techniques have been described that facilitate a UE accessing multiple ROs. The cellular NW can indicate whether it supports such multi-RO access. For example, such NW configuration can be signaled as part of a broadcasted system information.

The UE can access a first RO and report its intention to access one or more further ROs, e.g., using ED transmitted as part of the RA procedure associated with the access of the first RO. as a general rule, the UE can provide a device configuration for the multi-RO access and/or a device parameter for the multi-beam operation to the cellular NW, e.g., as ED. The UE could indicate the expected number of ROs to be accessed and/or the number of UL TX beams used for this. For instance, the UE may use the same UL TX beam for accessing two or more of multiple ROs.

The BS may assign RA preambles for the one or more further ROs as part of DL ED transmitted to the UE as part of the RA procedure associated with the access of the first random access occasion. Then, contention-free access is possible in the at least one further RA procedure associated with the one or more further ROs.

By means of such techniques, low delay to spatial diversity and/or multiplexing is possible already during initial access. The overall control signaling overhead can be limited.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various techniques have been described in which a 4-step RA procedure is used. Similar techniques may also be applied for a 2-step RA procedure. As a general rule, the 2-step RA procedure relies on a combination of RAmsg1 and RAmsg3 into RAmsgA, and on a combination of RAmsg2 and RAmsg4 into RAmsgB.

For further illustration, various examples have been described in which UL ED is piggybacked to RAmsg3. It is possible that at least parts of this information is provided via the RAmsg1, e.g., using preamble partitioning.

For further illustration, various examples have been described in which a DL RS is implemented by SSB. In other examples, other kinds and types of DL RS may be used.

For still further illustration, various examples have been described in which the UE selects the strongest DL TX beams. In other examples, other and/or further quality metrics could be taken into account, e.g., signal-to-noise ratio.

For still further illustration, above, various scenarios have been described in which a single BS receives RAmsg1 or RAmsgA on multiple ROs accessed by a UE and monitored by that single BS. Similar techniques may be applicable to scenarios in which multiple ROs associated with SSBs of a burst and accessed by a UE are monitored by different BSs, e.g., through TRPs.

The invention claimed is:

1. A method of operating a wireless communication device configured to connect to a communications network, the method comprising:
    monitoring for multiple downlink reference signals transmitted by at least one access node of the communications network using multiple downlink transmit beams, each one of the multiple downlink reference signals being associated with a respective at least one of multiple random-access occasions, accessing at least two random-access occasions of the multiple random-access occasions, the at least two random-access occasions being associated with at least two downlink reference signals selected from the multiple downlink reference signals based on said monitoring, and establishing a multi-beam operation between the wireless communication device and the communications network, wherein the multi-beam operation is established based on at least two downlink transmit beams used for transmitting the selected at least two downlink reference signals.

2. The method of claim 1,
wherein said accessing of the at least two random-access occasions is in accordance with at least one configuration communicated between the wireless communication device and the communications network.

3. The method of claim 1, further comprising:
receiving a network configuration from the communications network,
wherein the at least two random-access occasions are accessed in accordance with the network configuration.

4. The method of claim 3,
wherein the network configuration is indicative of a maximum number of random-access occasions to be accessed by the wireless communication device.

5. The method of claim 3,
wherein the network configuration is indicative of whether the wireless communication device is to use the same or different uplink transmit beams are used for said accessing of the at least two random-access occasions.

6. The method of claim 3,
wherein the network configuration is indicative of a minimum number of uplink transmit beams to be used by the wireless communication device for said accessing of the at least two random-access occasions,
wherein the minimum number of uplink transit beams optionally depends on a number of the at least two random-access occasions.

7. The method of claim 3,
wherein the network configuration is indicative of a network support of access to multiple random-access occasions.

8. The method of claim 1, further comprising:
transmitting a device configuration of said accessing of the at least two random-access occasions to the communications network,
wherein said accessing of the at least two random-access occasions is in accordance with the device configuration.

9. The method of claim 8,
wherein the device configuration is indicative of whether the same or different uplink transmit beams are used for said accessing of the at least two random-access occasions.

10. The method of claim 8,
wherein the device configuration is indicative of a number of random-access occasions accessed by the wireless communication device.

11. The method of claim 8,
wherein the device configuration is transmitted in a random-access procedure associated with at least one of the at least two random-access occasions.

12. The method of claim 8,
wherein the device configuration is indicative of a number of uplink transmit beams that are used for said accessing of the at least two random-access occasions.

13. The method of claim 8, further comprising:
receiving a network configuration from the communications network, and
wherein the at least two random-access occasions are accessed in accordance with the network configuration; and
wherein the device configuration is determined based on the network configuration.

14. The method of claim 1, further comprising:
transmitting a device parameter of the multi-beam operation to the communications network,
wherein the multi-beam operation is established in accordance with the device parameter.

15. The method of claim 14,
wherein the device parameter comprises a mode of the multi-beam operation selected from: diversity, and spatial multiplexing.

16. The method of claim 14,
wherein the device parameter comprises a frontend capability of a wireless interface of the wireless communication device.

17. The method of claim 14,
wherein the device parameter comprises a beam priority order of the at least two downlink transmit beams, the beam priority order depending on a receive property of the at least two downlink reference signals.

18. The method of claim 14,
wherein the device parameter is transmitted in a random-access procedure associated with said accessing of the at least two random-access occasions.

19. The method of claim 1,
wherein the at least two random-access occasions are accessed using the same uplink transmit beam.

20. A method of operating at least one access node of a communications network, the method comprising:
transmitting multiple downlink reference signals using multiple downlink transmit beams, each one of the multiple downlink reference signals being associated with a respective at least one of multiple random-access occasions,
monitoring an access of the wireless communication device to at least two random-access occasions associated with at least two downlink reference signals of the multiple downlink reference signals, and
based on said monitoring of the access, establishing a multi-beam operation between the wireless communication device and the communications network, wherein the multi-beam operation is established based on at least two downlink transmit beams of the multiple downlink transmit beams used for transmitting the at least two downlink reference signals.

* * * * *